(12) United States Patent
Hsu

(10) Patent No.: US 6,431,215 B1
(45) Date of Patent: Aug. 13, 2002

(54) PLUG FOR USE WITH A CONDUIT HAVING CABLES RECEIVED IN THE CONDUIT

(75) Inventor: Ching-Huang Hsu, Lu-Chou (TW)

(73) Assignee: Potter Co., Ltd., Taipei (TW)

( * ) Notice: Subject to any disclaimer, the term of this patent is extended or adjusted under 35 U.S.C. 154(b) by 0 days.

(21) Appl. No.: 10/087,815

(22) Filed: Mar. 5, 2002

(51) Int. Cl.$^7$ .......................... H02G 15/00; F16L 55/10
(52) U.S. Cl. ..................... 138/89; 138/90; 138/108; 174/77 R; 174/23 R
(58) Field of Search .................. 138/89, 90, 108; 174/77 R, 23 R, 99 R

(56) References Cited

U.S. PATENT DOCUMENTS

| | | | | |
|---|---|---|---|---|
| 3,964,754 A | * | 6/1976 | Murai et al. ................ | 138/108 |
| 4,267,401 A | * | 5/1981 | Wilkinson ................... | 174/151 |
| 4,622,436 A | * | 11/1986 | Kinnan ...................... | 174/23 R |
| 4,886,939 A | * | 12/1989 | Kinnan ........................ | 138/89 |

\* cited by examiner

*Primary Examiner*—Patrick Brinson
(74) *Attorney, Agent, or Firm*—Bacon & Thomas, PLLC

(57) ABSTRACT

A conduit plug has a securing element, a retainer, an enclosing element, an elastomer, a pusher and trapezoidal stops. The retainer has an outer threading corresponding to the inner threading of the securing element and extensions each extension having a wedged end formed on a free end of the extension. Each extension extends through a corresponding one of the holes in the enclosing element, through holes in the elastomer, bores in the pusher and slits in the stops so as to securely engage with a face of the trapezoidal stop. The mating of the inner and outer threading is able to deform the elastomer so as to accomplish the purpose of water leakage prevention.

8 Claims, 5 Drawing Sheets

PLUG FOR USE WITH A CONDUIT HAVING CABLES RECEIVED IN THE CONDUIT

BACKGROUND OF THE INVENTION

1. Field of the Invention

The present invention relates to a plug, and more particularly to a plug adapted to be used with a conduit having cables received in the conduit so as to prevent water from going into the conduit to shortcircuit the cables.

2. Description of Related Art

Normally, after the cables (not shown) are placed inside the conduit, workers will place a conduit plug inside the conduit to prevent water from going into the conduit. With reference to FIG. 5, a conventional conduit plug (80) is shown and composed of a pair of symmetrically corresponding secondary retainers (81'), a hollow elastomer (82'), a pair of symmetrically corresponding secondary pushers (83') and a pair of symmetrically corresponding secondary securing elements (84').

The secondary retainers (81') are able to combine to form a retainer (81). The secondary pushers (83') are able to combine to form a pusher (83) and the secondary securing elements (84') are able to form a securing element (84).

The retainer (81) has a passage (811) defined therethrough, an outer threading (812) formed on an outer periphery of the retainer (81) and a first flange (813) formed on a distal end of the retainer (81).

The pusher (83) has a second flange (831) integrally formed to correspond to the first flange (813) and a path (832) defined through the pusher (83) to communicate with the passage (811). The securing element (84) has a passageway (841) defined therethrough to correspond to the path (832) of the pusher (83) and an inner threading (842) formed in a periphery defining the passageway (841) to correspond to the outer threading (812) of the retainer (81).

With reference to FIG. 6, when the conventional conduit plug (80) is assembled, the elastomer (82) is mounted around the retainer (81) and sandwiched between the first flange (813) and the second flange (831). When the conduit plug (80) is implemented, a cable (70) extends through the pusher (83), the elastomer (82) and the passage (811) of the retainer (81). A portion of the retainer (81) extends out of the pusher (83) and has the outer threading (812) exposed outside the pusher (83). Then, the worker is able to use the inner threading (842) of the securing element (84) to screw with the outer threading (812) of the retainer (81). Before the securing element (84) securely screws with the retainer (81), the worker pushes the conduit plug (80) into a conduit (69) along the cable (70). Thereafter, the worker screws the securing element (84) to further screw to the retainer (81). It is to be noted that when the conduit plug (80) is first placed into the conduit (69), the engagement between the elastomer (82) and an inner periphery of the conduit (69) provides a good friction so that when securing the securing element (84) to the retainer (81), the retainer (81) will be forced to gradually move out of the conduit (69). Meanwhile, the elastomer (82) is deformed and thus the diameter thereof is increased, which gradually and securely abuts the inner periphery of the conduit (69) to accomplish the purpose of water leakage.

When using this type of conduit plug (80), drawbacks are encountered, such as, before screwing the securing element (84) to the retainer (81), the pair of secondary securing elements (84') may fall apart because there is no retaining device provided, thereto to prevent the pair of secondary securing elements (84') from separating from each other.

Water leakage may still occur so as to damage the reliability of the cable (70), because the elastomer (82) only abuts the inner periphery of the conduit (69) and there is nothing engaged with the periphery of the cable (70) to prevent water from going into the cable (70).

To overcome the shortcomings, the present invention tends to provide an improved conduit plug to mitigate and obviate the aforementioned problems.

SUMMARY OF THE INVENTION

The primary objective of the present invention is to provide an improved conduit plug having an elastomer able to abut the inner periphery of the conduit and the outer periphery of the cable to prevent water from damaging the reliability of the cable.

Another objective of the present invention is to provide an improved conduit plug having a pair of secondary securing elements with a retaining device provided to secure the attachment between the two secondary securing elements so that the two secondary securing elements are always attached to each other.

In order to accomplish the foregoing objective, the conduit plug of the present invention has a pair of secondary securing elements, a pair of secondary retainers, a pair of secondary enclosing elements, an elastomer, a pusher and trapezoidal stops. The secondary retainers are able to form an integral retainer having an outer threading and extensions extending out from the retainer and each extension having a wedged end formed on a free end of the extension. Each extension extends through a corresponding one of the holes in the enclosing element, through holes in the elastomer, bores in the pusher and slits in the stops so as to securely engage with a face of the trapezoidal stop. The secondary securing elements are able to form an integral securing element and has inner threading corresponding to the outer threading of the retainer such that the mating of the inner and outer threading is able to deform the elastomer so as to accomplish the purpose of water leakage prevention.

Further the securing element has a retaining device which comprises a receiving hole defined in one of the secondary securing elements and a boss formed on the other one of the secondary securing elements so that when the two secondary securing elements are detached from each other, the boss is received in the receiving hole so maintain the attachment between the two secondary securing elements.

Other objects, advantages and novel features of the invention will become more apparent from the following detailed description when taken in conjunction with the accompanying drawings.

DETAILED DESCRIPTION OF THE PREFERRED EMBODIMENT

Figure 1:
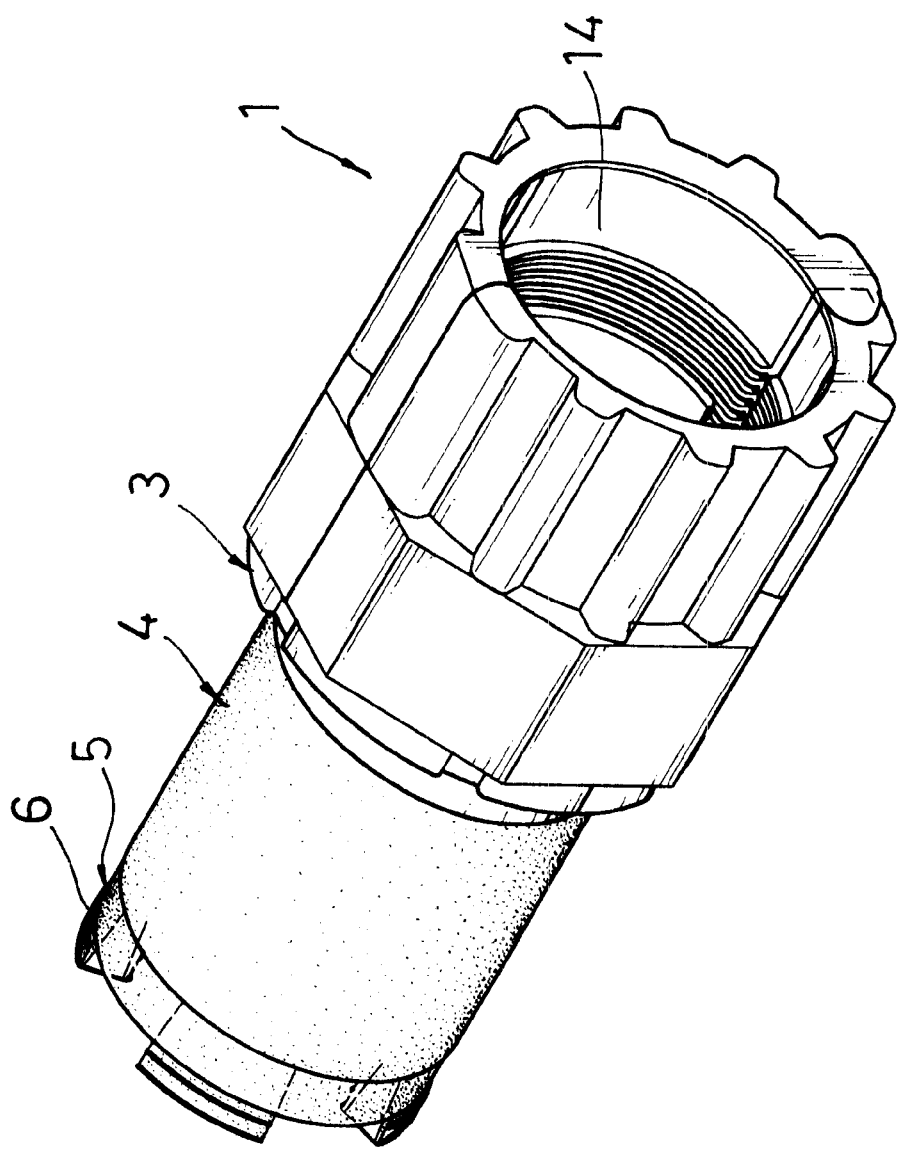
FIG. 1 is a perspective view of the conduit plug of the present invention.
Figure 2:
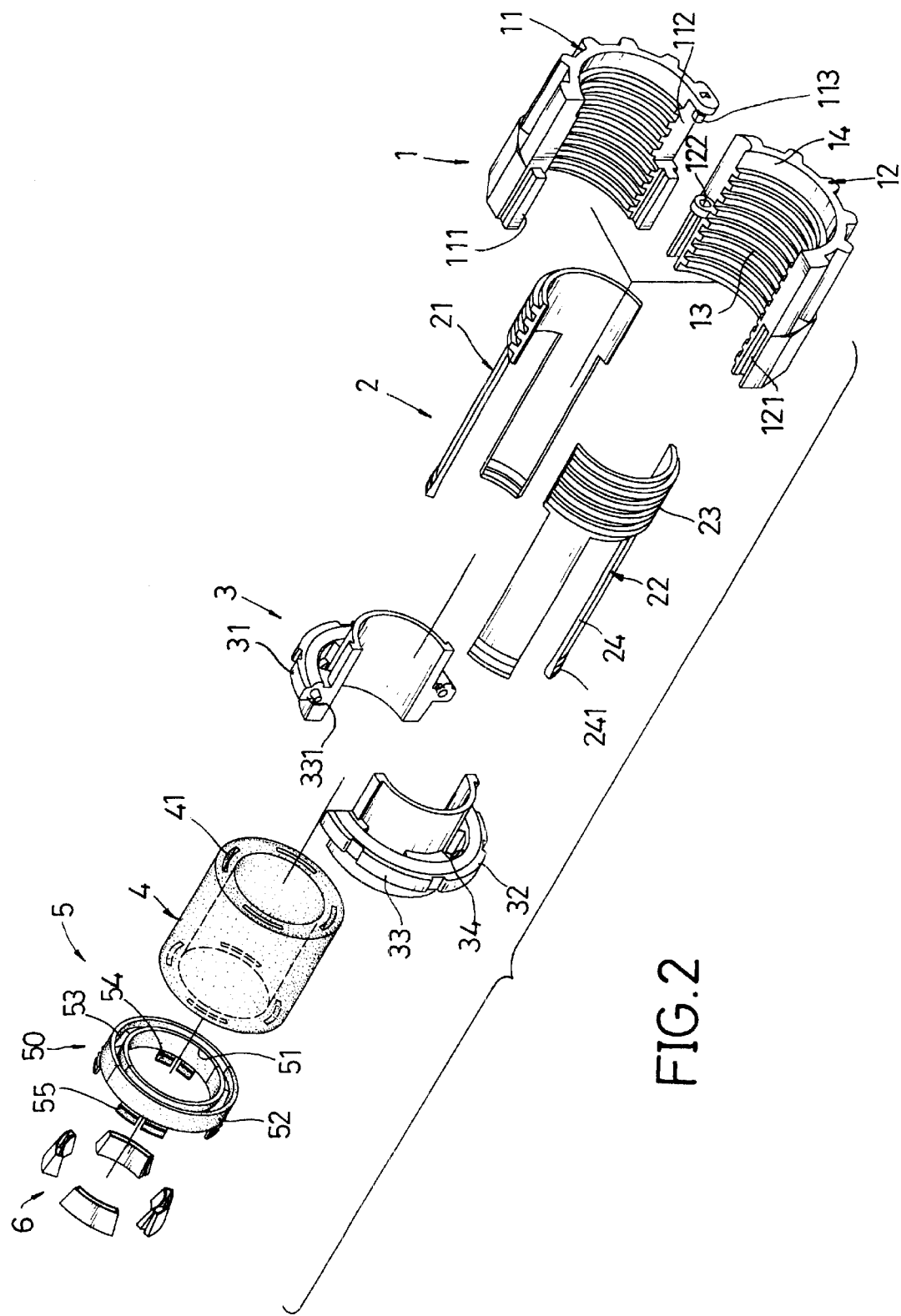
FIG. 2 is an exploded perspective view of the conduit plug in FIG. 1.

With reference to FIGS. 1 and 2, the conduit plug of the present invention has a securing element (1), a retainer (2), an enclosing element (3), an elastomer (4), a pusher (5) and trapezoidal stops (6).

The securing element (1) is composed of a first and a second secondary securing elements (11,12). The retainer (2) is composed of a first and a second secondary retainers (21,22) and the enclosing element (3) has a first and a second secondary enclosing elements (31,32).

The first secondary securing element (11) has a trapezoidal wall (111) formed on two peripheral edges of the first secondary securing element (11). The second secondary securing element (12) has a recess (121) configured on two peripheral edges of the second secondary securing element (12) and sized to slidably receive the trapezoidal wall (111) therein. When the two trapezoidal walls (111) of the first secondary securing element (11) are slidably received in the recesses (121) from an open end of each of the recesses (121), the first and the second secondary securing elements (11,12) are able to form an integral securing element (1) as shown in FIG. 1. After the first and second secondary securing elements (11,12) are assembled, an inner threading (13) is formed on an inner periphery of a channel (14) that defines through the securing element (1). Furthermore, the first secondary securing element (11) has a cutout (112) defined adjacent to a side face of the trapezoidal wall (111) and a boss (113) formed on a side face defining the cutout (112). The second secondary securing element (12) has a receiving hole (122) defined in a closed end of one of the recesses (12) to correspond to the boss (113). Therefore, when the trapezoidal walls (111) are slid away from the corresponding recesses (121), the boss (113) will fall into the receiving hole (122) in the second secondary securing element (12), such that the first and second secondary securing elements (11,12) are always attached to each other.

The retainer (2) is composed of a first and a second secondary retainers (21,22) each being a semicircular so that when the two secondary retainers (21,22) are combined, an integral outer threading (23) is formed on one end of the retainer (2). The retainer (2) has extensions (24) each extending out of the retainer (2) and having a wedged end (241) formed on a free end of the extension (24).

The enclosing element (3) is composed of a first and a second secondary enclosing elements (31,32) each being semicircular so that when the two secondary enclosing elements (31,32) are combined, a full circular enclosing element (3) is formed. The enclosing element (3) has a skirt (33) extending out from the enclosing element (3) and holes (33) defined along a periphery of the skirt (33) to correspond to the extensions (23) of the retainer (2). The elastomer (4) is hollow and has bores (41) defined in a periphery thereof to correspond to the extensions (24).

The pusher (5) is a ring-like element and has an inner ring (51), an outer ring (52) connected to the inner ring (51), bores (53) defined between the inner ring (51) and outer ring (52) to correspond to the extensions (23), inner hooks (54) extending out of the inner ring (51) and outer hooks (55) extending out of the outer ring (52). A gap (not numbered) between the inner and outer rings (51,52) are defined to receive therein a distal end of the elastomer (4).

The wedged shape stops (6) each have a slit (61) defined therethrough to correspond to the extensions (24) of the retainer (2).

When the foregoing elements are assembled, the extensions (23) extend through the holes (34) in the enclosing element (3), the through holes (41) in the elastomer (4), the bores (53) in the pusher (5) and the slits (61) in the stops (6). Thereafter, the securing element (1) with the trapezoidal walls (111) received in the corresponding recesses (121) connects to the retainer (2) with the inner threading (13) mated with the outer threading (23) so that the first and second secondary retainers (21,22) and the first and second secondary enclosing elements (31,42) are formed into one piece. After the extensions (24) extend through the slits (61) in the stops (6), the wedged ends (241) abut a bottom face of the stops (6) so as to secure the engagement among the stops (6), the pusher (5), the elastomer (4) and the enclosing element (3).

Figure 3:
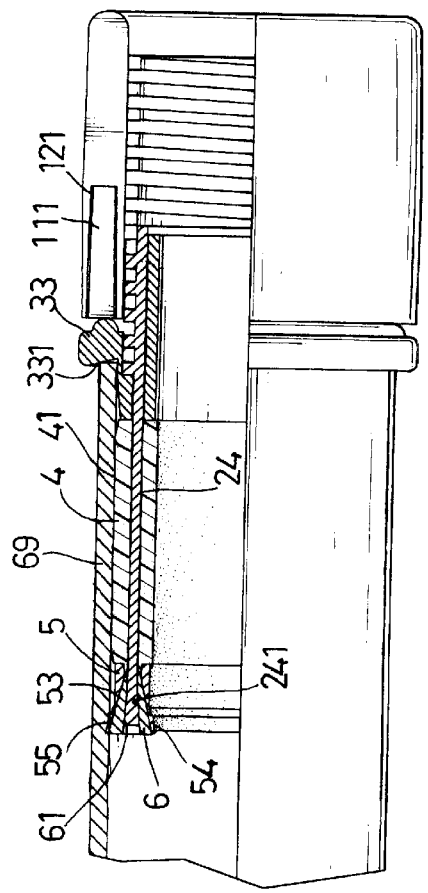
FIG. 3 is a schematic view showing that the conduit plug of the present invention is assembled on a conduit.

With reference to FIG. 3, when the conduit plug of the present invention is implemented and has a conduit (69) placing outside of the hollow conduit plug of the present invention, in order to prevent a distal side face of the elastomer (4) from protruding out of the skirt (33) of the enclosing element (3), a side face abutted to the distal side face of the elastomer (4) is provided with a tapered side face (331) such that when the distal side face of the elastomer (4) abuts the tapered side face (331) of the skirt (33) of the enclosing element (3), the distal side face of the elastomer (4) will not protrude out of the enclosing element (4) even when the elastomer (4) is under pressure.

Figure 4:
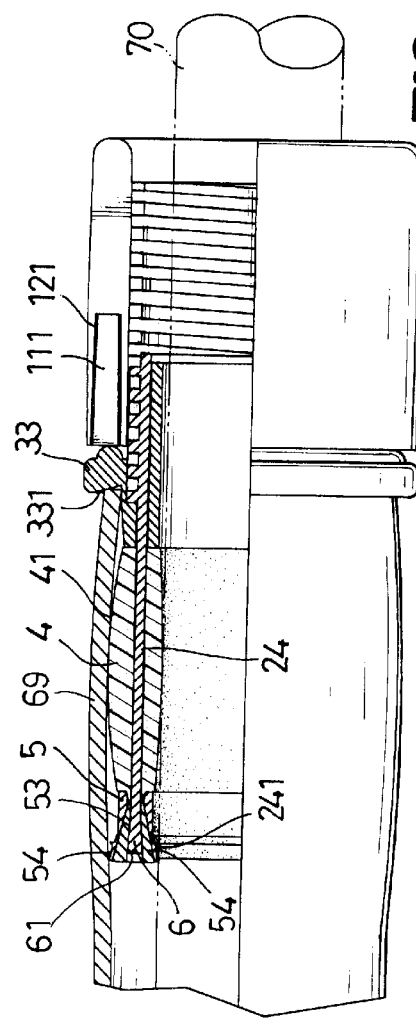
FIG. 4 is a schematic view showing that the elastomer is deformed due to the abutment between the pusher and the enclosing element so as to securely engage with an inner periphery of the conduit and an outer periphery of the cable received in the conduit.
Figure 5:
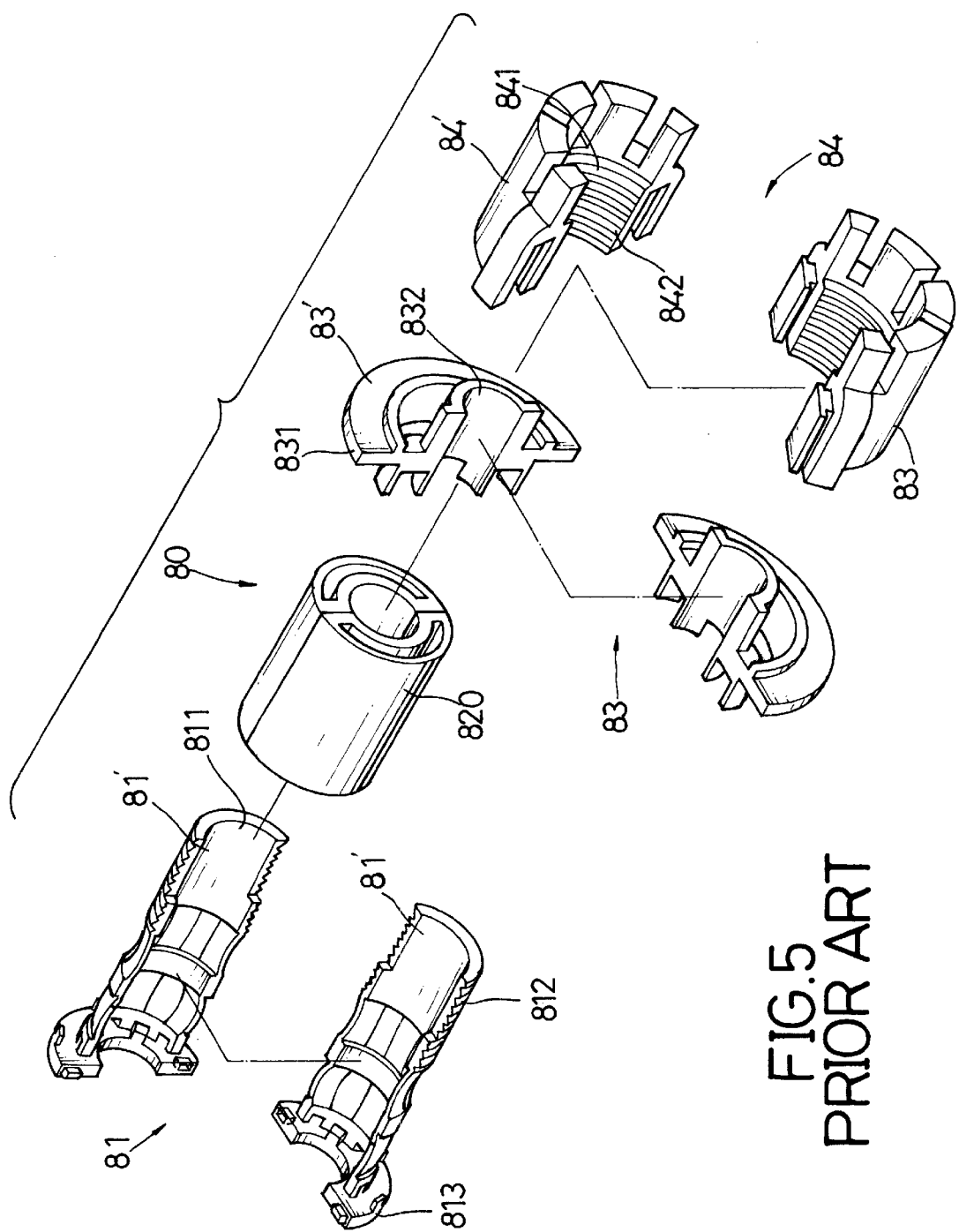
FIG. 5 is an exploded perspective view showing a conventional conduit plug.
Figure 6:
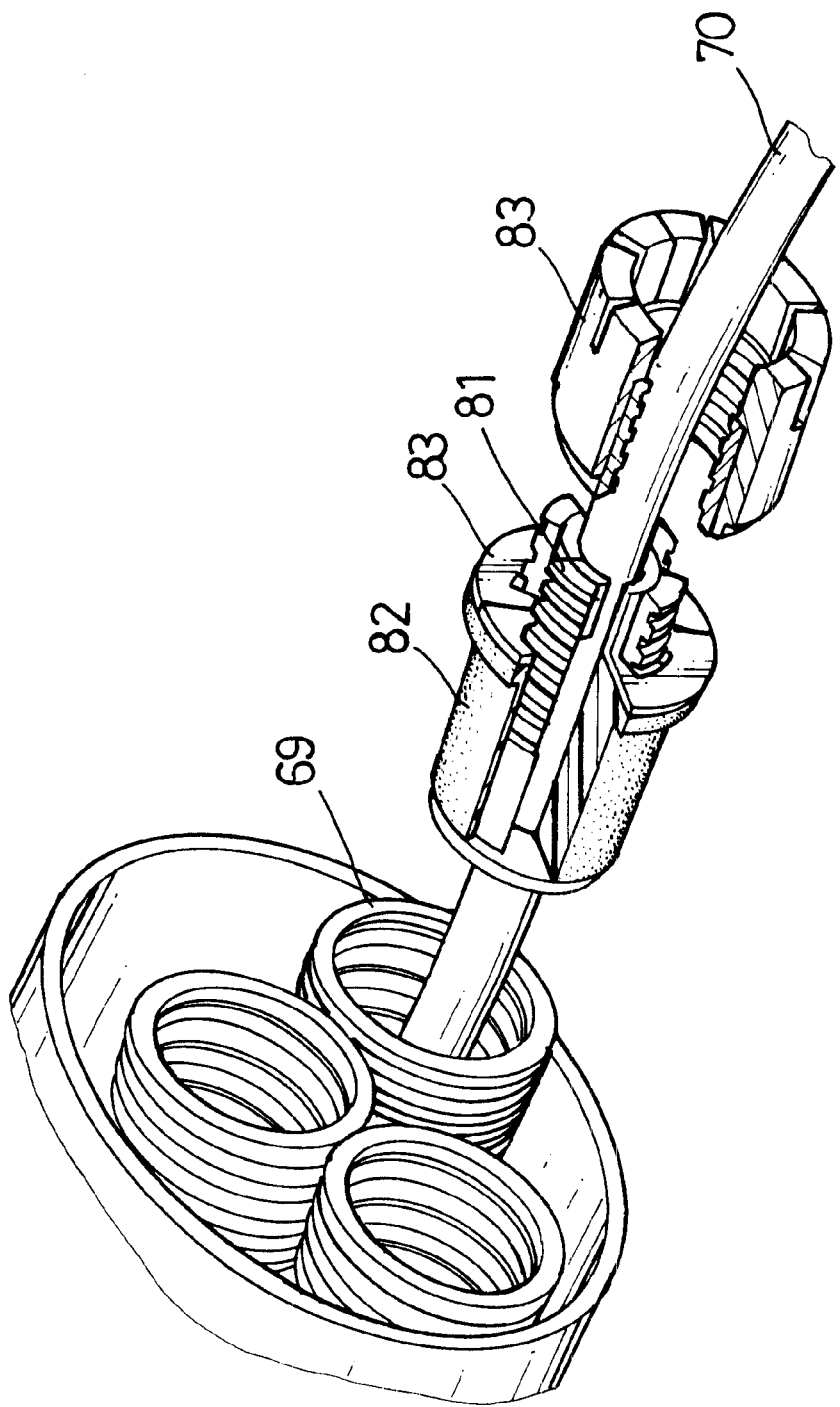
FIG. 6 is a schematic view showing that the conventional conduit plug is implemented to a cable to accomplish the purpose of water leakage prevention.

With reference to FIG. 4, when a cable (70) is inserted into the conduit (69), screwing the securing element (1) to further deform the elastomer (4) will cause opposite side faces of the elastomer (4) to simultaneously abut an inner periphery of the conduit (69) and an outer periphery of the cable (70), which provides double water leakage prevention to the conduit (69).

Furthermore, the inner hooks (54) are able to engage the outer periphery of the cable (70) and the outer hooks (55) are able to engage the inner periphery of the conduit (69) so as that the conduit plug is able to be securely received between the conduit (69) and the cable (70).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plug for use with a conduit receiving therein a cable, the plug comprising:

a first and a second secondary securing elements each being semicircular so as to form a circular configuration when the first and second secondary securing elements are combined to form a securing element, the first and second secondary securing elements having a securing device provided therebetween so as to maintain attachment between the first and second secondary securing elements, the securing element having therein an inner threading;

a retainer having an outer threading corresponding to the inner threading of the securing element, extensions extending out of the retainer and having a wedged end formed on a free end of each extension;

an enclosing element having a skirt formed on an outer periphery of the enclosing element and holes defined between the outer periphery and the skirt to correspond to the extensions of the retainer so as to allow the extensions to extend through the holes;

an elastomer having through holes defined through a periphery of the elastomer to allow the extensions to extend through the through holes;

a pusher clamping the elastomer with the enclosing element and having bores defined to correspond to the extensions; and wedged shaped stops each having a slit defined to correspond to the extensions of the retainer, whereby screwing the securing element to the retainer by the mating of the inner threading and the outer threading will deform the elastomer due to the extension of the extensions of the retainer through the holes of the enclosing element, the through holes of the elastomer, the bores of the pusher and the slits of the stops and the abutment of the wedged ends of the extensions to a side face of the stops.

2. The plug as claimed in claim 1, wherein the securing device is composed of trapezoidal walls formed on opposite side walls of the first secondary securing element and recesses defined in opposite side walls of the second secondary securing element to slidably receiving therein the trapezoidal walls.

3. The plug as claimed in claim 2 further comprising a cutout defined in one of the side faces having the trapezoidal walls, a boss formed on a side face opposite to the trapezoidal wall, a receiving hole defined in a closed end of one of the recesses to correspond to the boss, so that when the trapezoidal walls are slidably removed out of the recesses from open ends of the recesses, the boss falls into the receiving hole to maintain the first and second secondary securing elements to be engaged.

4. The plug as claimed in claim 1, wherein the pusher has inner hooks formed to be adapted to engage with an outer periphery of the cable and outer hooks formed to adapt to engage with an inner periphery of the conduit.

5. The plug as claimed in claim 3, wherein the pusher has inner hooks formed to be adapted to engage with an outer periphery of the cable and outer hooks formed to adapt to engage with an inner periphery of the conduit.

6. The plug as claimed in claim 1, wherein the skirt has a tapered side face formed to abut a side face of the elastomer to prevent the elastomer to protrude out of the skirt.

7. The plug as claimed in claim 1, wherein the pusher has an inner ring and an outer ring connected to the inner ring, a gap between the inner ring and the outer ring is defined to receive therein a side face of the elastomer.

8. The plug as claimed in claim 5, wherein the skirt has a tapered side face formed to abut a first side face of the elastomer to prevent the elastomer to protrude out of the skirt, the pusher has an inner ring and an outer ring connected to the inner ring, a gap between the inner ring and the outer ring is defined to receive therein a second side face relative to the first side face of the elastomer.

* * * * *